United States Patent
Buckley (10) Patent No.: US 7,328,016 B2
(45) Date of Patent: Feb. 5, 2008

(54) APPARATUS, AND ASSOCIATED METHOD, FOR FACILITATING NETWORK SELECTION AT A MOBILE NODE UTILIZING A NETWORK SELECTION LIST MAINTAINED THEREAT

(75) Inventor: Adrian Buckley, Brentwood, CA (US)

(73) Assignee: Research In Motion Limited, Waterloo (CA)

( * ) Notice: Subject to any disclaimer, the term of this patent is extended or adjusted under 35 U.S.C. 154(b) by 240 days.

(21) Appl. No.: 10/787,901

(22) Filed: Feb. 25, 2004

(65) Prior Publication Data

US 2005/0148333 A1 Jul. 7, 2005

Related U.S. Application Data

(60) Provisional application No. 60/534,737, filed on Jan. 7, 2004.

(51) Int. Cl.
*H04Q 7/20* (2006.01)
(52) U.S. Cl. .................................. 455/435.2
(58) Field of Classification Search .......... 455/435.2, 455/435.1, 435.3, 433, 434, 464, 509, 448, 455/425, 558, 557, 550.1, 432.1
See application file for complete search history.

(56) References Cited

U.S. PATENT DOCUMENTS 5,640,675 A * 6/1997 Pinault et al. ............. 455/434
5,884,168 A 3/1999 Kolev
6,085,085 A * 7/2000 Blakeney et al. ......... 455/426.1
6,173,179 B1 * 1/2001 Coutant .................... 455/432.1
6,387,027 B1 5/2002 Bodin
6,415,148 B1 * 7/2002 Chiniga et al. ............. 455/434
6,480,725 B2 * 11/2002 Cassidy et al. ............. 455/558
2004/0235522 A1 * 11/2004 Lin ............................ 455/558
2005/0101323 A1 * 5/2005 De Beer .................. 455/435.2
2005/0107083 A1 * 5/2005 Rager et al. ............. 455/435.1

FOREIGN PATENT DOCUMENTS

EP 0 973 347 A1 1/2000
WO WO 02/067563 A1 8/2002

* cited by examiner

*Primary Examiner*—William Trost
*Assistant Examiner*—Marivelisse Santiago-Cordero (57) ABSTRACT

Apparatus, and an associated method, for facilitating with which network of a group of wireless local area networks that a mobile node attempts to communicate. Network selection utilizes a network selection list. The network selection list is contained at a SIM card, or the like, if the SIM card is constructed in conformity with a 3GPP (Third Generation Partnership Project) specification. Otherwise, if the card is a legacy card, the network selection list that is used is retrieved from an internal memory element of the mobile node.

12 Claims, 4 Drawing Sheets

APPARATUS, AND ASSOCIATED METHOD, FOR FACILITATING NETWORK SELECTION AT A MOBILE NODE UTILIZING A NETWORK SELECTION LIST MAINTAINED THEREAT

CROSS-REFERENCE TO RELATED APPLICATIONS

The present invention claims the priority of provisional patent application 60/534,737, filed Jan. 7, 2004, the contents of which are incorporated herein.

The present invention relates generally to a manner by which to facilitate selection, at a mobile node, of with which network of a group of available networks with which the mobile node shall attempt to communicate. More particularly, the present invention relates to apparatus, and an associated method, by which to utilize a network selection list, maintained at the mobile node, in the selection of the network.

When a removable storage element, such as a (U) SIM R-UIM card used by a WLAN-capable mobile node, is capable of maintaining the network selection list, the list created and maintained thereat is used pursuant to the selection process. If the removable storage element forms a legacy element, i.e., is incapable of maintaining the network selection list, a network selection list created and maintained at a permanent memory element of the mobile node is used pursuant to the selection process. Appropriate network selection is made at the mobile node irrespective of the memory capabilities of the removable storage card. If a legacy storage card, i.e., a storage card unpermitting of storage of the network selection list thereat is used at the mobile node, the listing stored at the permanent memory element of the mobile node is maintained and used. And, if the storage card is permitting of storage of the network selection list thereat, that listing is maintained and used pursuant to the selection process.

BACKGROUND OF THE INVENTION

The use of modern communication systems through which to communicate is a necessary aspect of modern society. Many different communication services are regularly effectuated by many different users to effectuate many different types of communication services. Many essential, as well as many other, services are predicated upon the ready availability of, and ready access to, communication systems.

As advancements in communication technologies continue, additional communication services, as well as improvements to existing communication services, shall likely become available. Generally, the advancements in communication technologies provide manners by which to communicate data, communicated to effectuate a communication service, in more efficient manners, or at higher data communication rates, or in manners that better provide for successful delivery of data to a receiving station in spite of adverse communication conditions.

The use of digital communication techniques, for instance, has been made possible as a result of technological advancements in communication technologies. Many modern communication systems utilize digital communication techniques. The use of digital communication techniques provides various advantages. By digitizing data, redundancies in the data are more readily removed, permitting the data to be communicated in more efficient form, free of redundancies. Improved data throughput rates or reduced bandwidth requirements needed to communicate the data are permitted.

A radio communication system is an exemplary type of communication system. Digital communication techniques are regularly utilized in many modern radio communication systems.

A cellular communication system is an exemplary type of radio communication system. While cellular communication systems are constructed to be operable in conformity with any of various operating standards, the cellular communication systems generally include network infrastructures having a plurality of spaced-apart base transceiver stations. The base transceiver stations each define cells, and portable communication stations, carried by users, are generally able to communicate with a base transceiver station in whose cell that the portable communication station is positioned when communications are effectuated.

Several analogous types of wireless communication systems have been implemented, and others have been proposed, to encompass limited areas, for example, areas encompassed by a business office or building structure. So-called micro-cellular networks, private networks, and WLANs (Wireless Local Area Networks) are representative of radio communication systems that are operable, at least in various aspects, in manners analogous to operation of a cellular communication system. Additionally, communication systems that utilize ad hoc networks, i.e., do not utilize a fixed network, are also utilized or undergoing development.

Wireless communication systems, such as the aforementioned wireless local area networks are generally constructed to be operable in conformity with the operating protocols of a selected communication standard. While various promulgated operating standards have achieved widespread adoption, many wireless local area networks are constructed to be operable in conformity with an IEEE 802.11(b), operating specification, or a variant thereof. The IEEE 802.11(b) standard is promulgated by the IEEE, and the operating specification has become a predominant wireless LAN standard pertaining to a commercial 2.4 GHz wireless LAN (Local Area Network) frequency range as well as an unregulated band in the 5 GHz frequency range. The 802.11(b) standard specifies, amongst other things, an over the air interface between a wireless client, e.g., a mobile node, and a base station or access point.

Cellular communication system are generally operable pursuant to other operating specifications. Mobile nodes are increasingly constructed to be operable in both a WLAN and in a cellular communication system. And, standard-creating groups, such as the 3GPP, are promulgating standards related to interworking arrangements between WLANs and the networks of cellular communication systems.

Unlike some other communication systems implemented at other frequency bands, the frequency bands allocated for wireless local area networks are relatively unregulated, permitting their speedy deployment and re-deployment, as needed.

Mobile nodes operable in wireless local area networks are typically constructed to monitor selected frequencies within the allocated frequency bands to detect a wireless local area network within communication range of the mobile node. Access points, or other devices, of a wireless local area network broadcast signals to alert mobile nodes of the wireless local area networks of which the access points, or other devices, form portions.

A mobile node might well be positioned at a location encompassed by more than one wireless local area network with which the mobile node is capable of communicating. Selection is required to be made of with which of the networks with which the mobile node shall attempt to communicate. Proposals have been set forth to define manners by which the mobile node makes its selection. For instance, in proposals for the 3GPP (Third Generation Partnership Project) operating specification relating to third-generation radio communication systems, proposals are set forth that define the manner by which the mobile node is to select the network with which to communicate. And, in particular, the proposals make use of network selection lists that indicate which WLAN networks with which the mobile node should first attempt to communicate.

In existing proposals, the network selection list is to be formed at a removable storage element, herein referred to, at times, as a smart card, such as a smart card (U) SIM/R-UIM. While, prospectively, the smart cards are well capable of storing such network selection lists, certain legacy smart cards are unable to store, and permit maintenance of, the network selection lists in manners now-proposed.

A manner is thereby required by which to facilitate network selection utilizing network selection lists at the mobile node irrespective of whether the mobile node utilizes a smart card of new construction or a legacy smart card.

It is in light of this background information related to network selection by a WLAN-capable mobile node that the significant improvements of the present invention have evolved.

SUMMARY OF THE INVENTION

The present invention, accordingly, advantageously provides apparatus, and an associated method, by which to facilitate selection, at a mobile node, of with which network of a group of available networks through which the mobile node shall attempt to communicate.

Through operation of an embodiment of the present invention, a manner is provided by which to utilize a network selection list, maintained at the mobile node, in the selection of the network.

The mobile node includes a removable storage element, e.g., a smart card, such as a (U) SIM/R-UIM card. When the smart card is of new construction, i.e., is capable of storing the network selection list or lists thereat in conformity with new WLAN interworking proposals, the list created and maintained thereat is used pursuant to the selection process.

If, conversely, the smart card is a legacy card, i.e., is unpermitting of maintaining the network selection list in manners as now-proposed in the specification promulgation, the permanent memory element of the mobile node is used to maintain the network selection listing and used pursuant to network selection procedures.

Thereby, network selection utilizing a network selection list is performed at the mobile node irrespective of the type of smart card positioned thereat.

In one aspect of the present invention, a determiner is embodied at the mobile node, capable of accessing the removable storage element, when positioned at, and connected to, the mobile node. The determiner determines whether the removable storage element is of capabilities to store a network selection list thereat. The determiner is further operable, upon determination that the removable storage element is capable of storing the network selection list, to determine whether a network selection is stored thereat. Determination is made, for instance, through an interrogation procedure by which the removable storage element is interrogated to ascertain its contents, namely, whether the removable storage element contains the network selection list. In one implementation, the removable storage element includes, or otherwise defines, a flag location that is populated with a flag of a selected flag value when the removable storage element is capable of storing the network selection list. Determinations made by the determiner are made by locating the flag location and ascertaining the value, if any, of the flag value populating the flag location.

If the determiner determines that the removable storage element contains the network selection list, the entries that form the network selection list are used by which to select with which network of available networks that the mobile node attempts to communicate.

In another aspect of the present invention, the determiner operates to make the determination upon powering-up of the mobile node, e.g., each time in which the mobile node is turned-on responsive to which, the determiner determines the capabilities of the removable storage card positioned thereat. That is to say, each time in which the mobile node is turned-on, the determiner accesses the removable storage element and determines whether the removable storage element stores the network selection list thereat. In a further aspect, the determiner also is operable responsive to replacement of the removable storage card at the mobile node. If, for instance, the removable element is removed out of its connection with the mobile node and replaced with another removable storage element, or the same storage element is re-connected to the mobile node, the determiner makes a determination of the capabilities of the removable storage element and whether the removable storage element contains a network selection list.

In another aspect of the present invention, a selector is coupled to receive indications of determinations made by the determiner. The selector is selectably operable to select whether to utilize the network selection list retrieved from the removable storage element or a network storage list stored at a memory element of the mobile node, i.e., a memory element that is permanently or semi-permanently installed at the mobile node. If the determiner determines that the removable storage element is capable of storing the network selection list and that a network selection list is stored thereat, selection of with which network through which the mobile node attempts to communicate is made utilizing the network selection list retrieved from the removable storage element. If, conversely, the removable storage element is not of characteristics permitting its storage thereat of the network selection list, a network selection list maintained at the mobile-node storage element is instead utilized to select with which network that the mobile node attempts to communicate.

Thereby, the network selection list retrieved from the removable storage element is utilized, if possible. Otherwise, a network storage list maintained at the mobile node is utilized pursuant to the selection process.

In a further aspect of the present invention, a downloader is utilized to download the network selection list, if any, stored at the removable storage element to the mobile-node storage element. By downloading the network selection list, if the removable storage element is removed and replaced with a removable storage element that does not permit or maintain a network selection list, an updated network selection list is available at the mobile-node storage element from which to make selection by the selector.

In a yet further aspect of the present invention, the downloader further provides for downloading of the network selection list to the mobile node from a network by way of a radio air interface in the event that a network selection list is not available at either of the storage elements or an updated network selection list is needed. If a network selection list is downloaded by way of the radio air interface, the network selection list is stored at the mobile node, available for subsequent access to and retrieval from the list to identify a network through which the mobile node is to communicate.

The operation of an embodiment of the present invention facilitates network selection of the network through which the mobile node attempts to communicate whether the removable storage element forms a legacy device or is capable of containing a network selection list. The manner of operation therefore is backwardly-compatible, operable when the removable storage element is the legacy element as well as operable when the removable storage element is of more modern construction to permit storage thereat of a network selection list.

In these and other aspects, therefore, apparatus, and an associated method, is provided for a radio communication system. The radio communication system has a mobile node selectably operable to communicate data within at least a first selected frequency band within which a group of networks are operable to communicate. The mobile node selectably contains a removable storage element of first selected characteristics and contains a second storage element. Selection of at least a first selected network of the group of networks with which to attempt to communicate is facilitated. A determiner is embodied at the mobile node. The determiner determines whether the removable storage element, selectably contained at the mobile node, is of first selected characteristics. A selector is adapted to receive indications of determinations made by the determiner. The selector selects the at least the first selected network of the group of networks with which to attempt to communicate. Selection is made by the selector responsive to indications stored at the removable storage element if determinations made by the determiner indicate the removable storage element to be of the first selected characteristics and, otherwise, responsive to indications stored at the second storage element.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
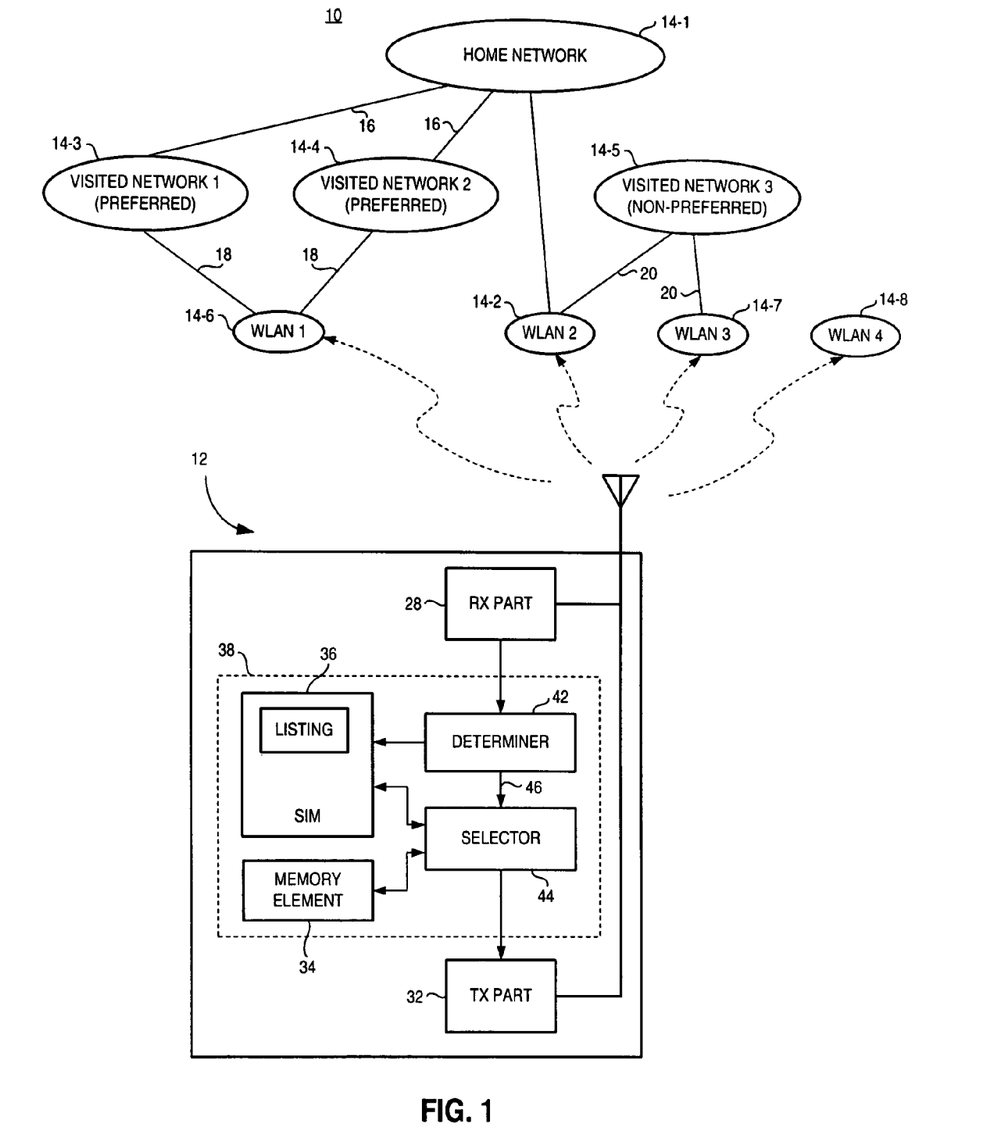
FIG. 1 illustrates a functional block diagram of a radio communication system in which an embodiment of the present invention is operable.

Referring to FIG. 1, a radio communication system shown generally at 10, provides for the effectuation of communication services with mobile nodes, of which the mobile node 12 is representative. The mobile node is provided mobility, carried, for instance, by a user of the mobile node, to be positionable, at different times, at different locations.

In the exemplary implementation, the mobile node is operable pursuant to the operating parameters and protocols of an IEEE 802.11(b) operating standard. Other portions of the communication system also, in the exemplary implementation, are operable to communicate in conformity with the IEEE 802.11(b) operating specification. And, the following description of exemplary operation of the communication system 10 shall be described with respect to its operation pursuant to the IEEE 802.11(b) operating specification, the radio communication system and the components thereof, are analogously operable pursuant to other operating standards. For example, the communication system is alternately operable pursuant to the IEEE 802.11(a) or (g) standards, or another communication standard. And, operation of the radio communication system can analogously be described with respect to its implementation to be operable to communicate pursuant to such other operating specifications.

The communication system includes a network part formed of a plurality of networks 14. A home network 14-1, here a cellular network, is associated with the mobile node. That is to say, the network 14-1 is the home network of the mobile node. Other mobile nodes (not shown) also generally have associated therewith a home network, albeit not necessarily the home network 14-1 with which the mobile node 12 is associated. The network part of the communication system, here defined in terms of the designations of the networks utilized by the mobile node, is correspondingly altered when defined in terms of another mobile node.

The network 14-1 is operated by a network operator. And, here, the network operator also operates the network 14-2, a wireless local area network. The same SSID (Service Set Identifier) is used to identify both of the networks 14-1 and 14-2.

Three visited networks, networks 14-3, 14-4, and 14-5, are also shown in the figure. The networks 14-3, 14-4, and 14-5 also, for example, form cellular networks. Relationships, e.g., roaming relationships, are maintained by the operators of the networks 14-3 and 14-4. Segments 16 between the visited networks 14-3 and 14-1 and between the networks 14-4 and 14-1 are representative of the relationships. Due to the relationships of the operators of these networks with the operator of the home network, the networks 14-3 and 14-4 form preferred networks with respect to the home network. When the mobile node 12 is roaming, or is otherwise not communicating with its home network or the network 14-2, first communication preference is with one of the preferred networks 14-3 and 14-4, or a network associated therewith. Because a corresponding relationship is not maintained between the home network operator and the operator of the network 14-5, the network 14-5 forms a non-preferred network.

Relationships are also formed by the operators of the networks 14-3, 14-4, and 14-5 with other networks, here, e.g., WLANs. Relationships, indicated by the segments 18, are maintained by the networks 14-3 and 14-4 with the network 14-6. And, relationships are formed by the operator of the network 14-5 with the networks 14-2 and 14-7. Such relationships are indicated by the segments 20. An eighth network 14-8 is also represented. The network 14-8 is also a wireless local area network. The network 14-8 does not maintain a relationship with any of the other networks shown in the figure.

The mobile node includes radio transceiver circuitry capable of transceiving data with a network of the network part of the communication system. Here, the transceiver circuitry is represented by a receive part 28 and a transmit part 32. And, the mobile node is further shown to include a permanent memory element 34 and a removable smart card 36, or other storage element, such as a (U) SIM/R-UIM. The releasable nature of the smart card permits, at different times, smart cards of different constructions to be contained at, and form portions of, the mobile node. The smart card is, here, alternately of a construction permitting storage thereat of network selection lists, such as those proposed pursuant to the aforementioned third-generation partnership project. Or, alternately, the smart card is of a legacy construction, that is, of a construction that is not permitting of storage thereat of the network selection list.

The mobile node further includes apparatus 38 of an embodiment of the present invention. The apparatus is functionally represented, formed of entities that are implementable in any desired manner, such as by algorithms executable by processing circuitry. The apparatus is here shown to include a determiner 42 and a selector 44.

The determiner operates to determine the capability of the smart card 36. That is to say, the determiner determines whether the smart card is of a legacy construction or is permitting of storage of network selection lists. Determinations made by the determiner are provided to the selector, here indicated by way of the line 46. And, the selector, responsive to determinations made by the determiner, selects a network with which the mobile node is to attempt to communicate based, in part, upon the network selection list, accessed at either the smart card or the permanent memory element. If the smart card is of a capability permitting storage thereat of the network selection list or lists, the selector makes selection from the entries contained in such listing or listings. Alternately, if the smart card is of a legacy construction, the network selection listing is maintained at the permanent memory element, and selection is made by the selector therefrom. Selections made by the selector are utilized by the transmit part of the mobile node to attempt to form a communication link with the selected network.

The contents of the entries contained on the listing or listings are also updatable, updatable by way of traditional over-the-air methods or by way of a WLAN.

The apparatus, in one implementation, determines the capability of the smart card upon powering up of the mobile node. If the smart card, e.g., a (U) SIM/R-UIM is capable of storing the WLAN information, information stored at the smart card is used. Conversely, if the smart card is not capable of storing the information, then the information of the memory element of the mobile node. A determination of the value of a flag or an interrogation procedure is utilized to make the determination of the capability of the smart card.

Additionally, as the permanent memory element is potentially used by numerous smart cards, the memory element causes the WLAN preferences per network to be stored for each smart card that is inserted into the mobile node.

If, upon powering up of the mobile node, a determination is made that the smart card is capable of, or contains, the network listing, the listing stored at the smart card is copied into the memory element of the mobile node. It is assumed that the list on the smart card is more up to date than the list stored at the permanent memory element.

If, conversely, the smart card is a legacy smart card, the selector utilizes the list stored at the permanent memory element. And, if no listing is stored thereat, once service is obtained from a wireless local area network, a listing is downloaded to the mobile node and stored at the memory element. This list of networks shall then be stored for the operator that owns the smart card.

When a listing is updated, the mobile node requests the latest version of the listing from the network or the network sends updates to the mobile node.

Figure 2:
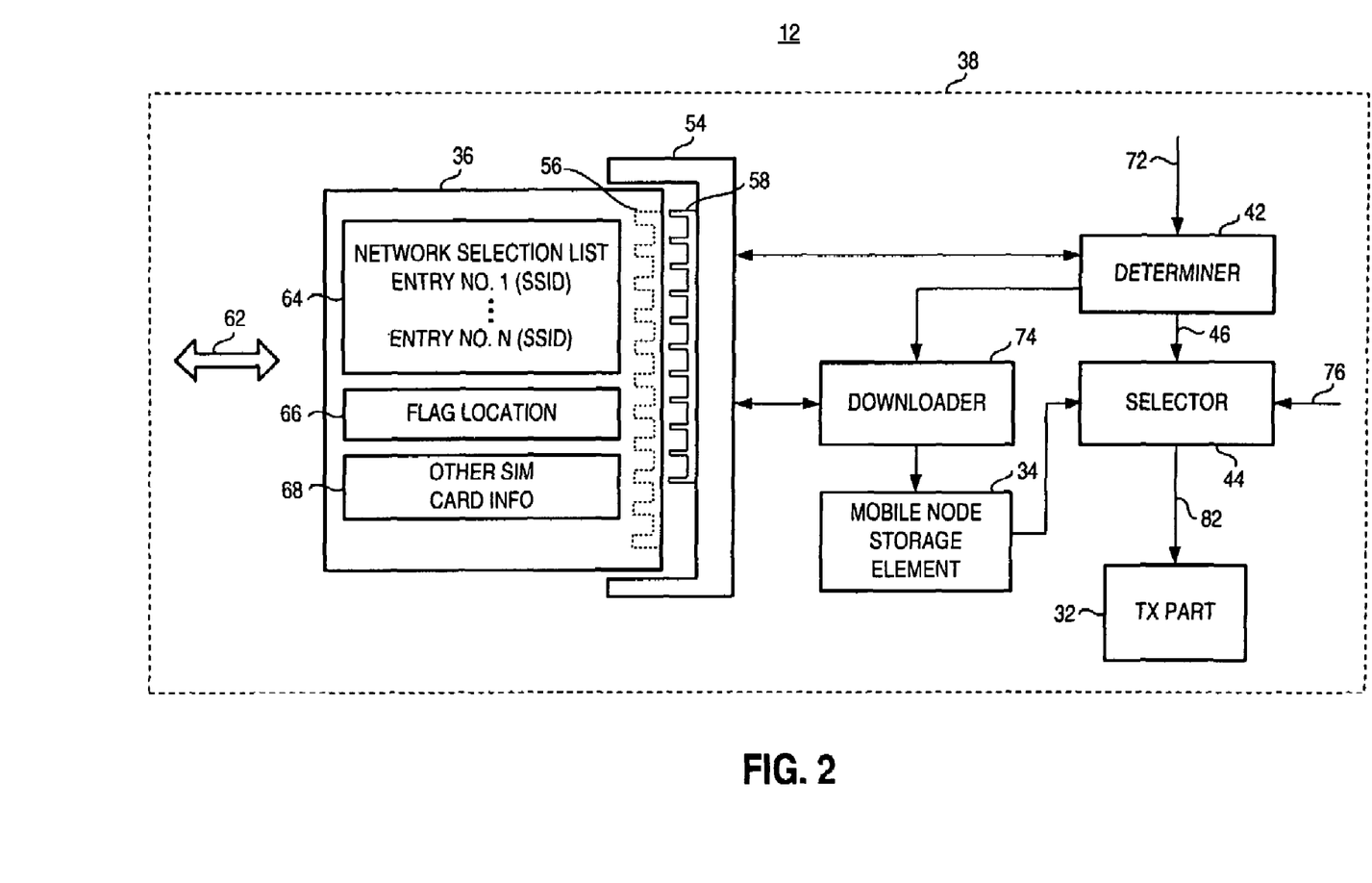
FIG. 2 illustrates a functional block diagram of a portion of the mobile node operable pursuant to an embodiment of the present invention.

FIG. 2 shows portions of the mobile node 12 that forms part of the radio communication system 10 shown in FIG. 1. Here, the apparatus 38 is again illustrated together with the smart card 36. The smart card is removably connectable to the mobile node, here by way of a receiving platform 54. The smart card is here shown to be positioned at the receiving platform to interconnect electrically electrodes 56 embodied at the smart card with corresponding electrodes 58 formed at the receiving platform. The arrow 62 represents the permitted movement of the smart card, alternately to position the smart card at the receiving platform 54 in and out of engagement with the smart card. The manner by which the smart card is placed into engagement with, or taken out of engagement with, the receiving platform is, of course, dependent upon the construction of the receiving platform.

The apparatus 38 is again shown to include a determiner 42 and selector, interconnected by way of the line 46 by way of which the determinations made by the determiner are provided to the selector. As noted previously, the determiner operates to determine whether the smart card, when positioned at the receiving platform and connected to the mobile node, is of selected characteristics, namely whether the smart card is of capability to maintain a storage selection list and, if capable of containing the selection list, contains the network selection list. Here, the card 36 is capable of containing the network selection list.

The card 36 is here shown to include the network selection list 64. Additionally, the card 36 includes a flag location 66, and also contains storage locations 68 for storing other smart card information.

In the exemplary implementation, the flag location 66 is populated with a flag value to indicate that the card contains a network selection list. The determiner operates to interrogate the flag location to determine the flag value that populates the flag location. Responsive to the interrogation, the determiner determines whether a network selection list is contained at the smart card that forms the removable storage element. In the exemplary implementation, the determiner operates upon powering-up of the mobile node, an indication of which is provided to the determiner, here represented by way of the arrow 72. In another implementation, the determiner is alternately, or additionally, operable each time in which the card 36 is removed and another, or the same, card is repositioned at the receiving platform. The arrow 72 is also representative of indications provided to the determiner of the repositioning of the card at the receiving platform.

Determinations made by the determiner are provided to the selector 44, here by way of the line 46, and also to a downloader 74. The downloader 74 operates to download the contents of the network selection list to the mobile node storage element 34 when the determiner determines that the network selection list is contained at the card 36. If, conversely, determination is made by the determiner that the network selection list is not contained at the card or that the card is not of capabilities to maintain a network selection list, no downloading is attempted or performed. If the determiner determines that the network selection list is maintained at the card, the downloader downloads the entry or entries contained thereat and the selector makes selection of with which network that the mobile node shall attempt to communicate. Selection is further based upon additional information, here represented to be provided to the selector by way of the line 76. The selection made by the selector is provided, by way of the line 82, to other portions of the mobile node, such as the transmit part, and communications are attempted to be effectuated with the selected network.

Figure 3:
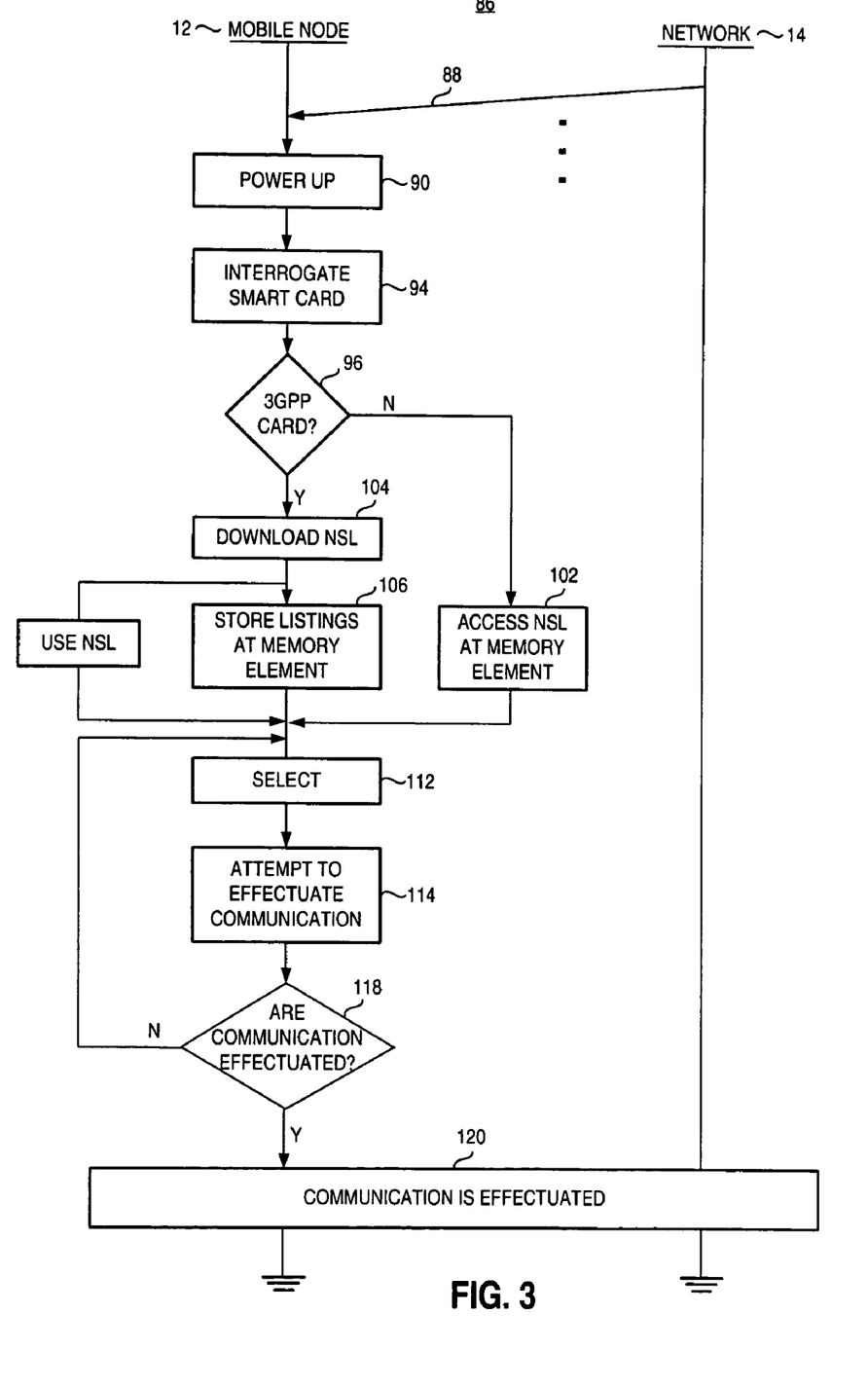
FIG. 3 illustrates a partial message sequence, partial process, diagram representative of operation of the communication system shown in FIG. 1 pursuant to an embodiment of the present invention.

FIG. 3 illustrates a representation, shown generally at 86, representative of operation of the communication system 10, shown in FIG. 1, pursuant to an embodiment of the present invention.

The various wireless local area networks 14 broadcast signals, indicated by the segments 88, at selected intervals that identify the respective networks by their SSID values or other identities. When the mobile node is positioned within detection range of the signals, the signals are detected and the mobile node includes such networks as possible networks with which to attempt to communicate.

The mobile node is powered-up, indicated by the block 90. And responsive to powering-up of the mobile node, the removable storage element positioned at the mobile node is interrogated, indicated by the block 94. Interrogation is also performed when detection is made that a smart card is removed and replaced with another card or the original card is repositioned to be connected to the mobile node. The block 90 is also representative of the repositioning or replacement of a card at the mobile node.

A determination is made, indicated by the decision block 96, as to whether the card exhibits selected characteristics, namely, whether a network selection list is maintained at the removable storage element. If not, the card is a legacy card and the no branch is taken to the block 102. Otherwise, the yes branch is taken to the block 104. At the block 104, the network selection list contained at the removable storage element is downloaded. And, as indicated by the block 106, the contents of the network selection list are stored at the mobile node. When the no branch is taken to the block 102, a network selection list is not contained at the removable storage element, and as indicated by the block 102, a network selection list maintained at the mobile node, in its internal memory, is instead accessed. Paths are taken from the blocks 102, 104, and 106 to the block 1 12. At the block 1 12, a selection is made of with which network to attempt to effectuate communications. Selection is based upon indications of the signals 88 detected by the mobile node and the network selection list, either that downloaded from the storage element, or a free-existent network selection list stored locally at the internal memory of the mobile node. Upon selection, communications are attempted to be effectuated, indicated by the block 114.

Thereafter, and as indicated by the decision block 118, a determination is made as to whether communications are effectuated. If not, the no branch is taken and selection procedures continue to select another, if available, network through which to attempt to communicate. Otherwise, the yes branch is taken and a communication session, such as communication of a data message, is effectuated, indicated at the block 120.

Figure 4:
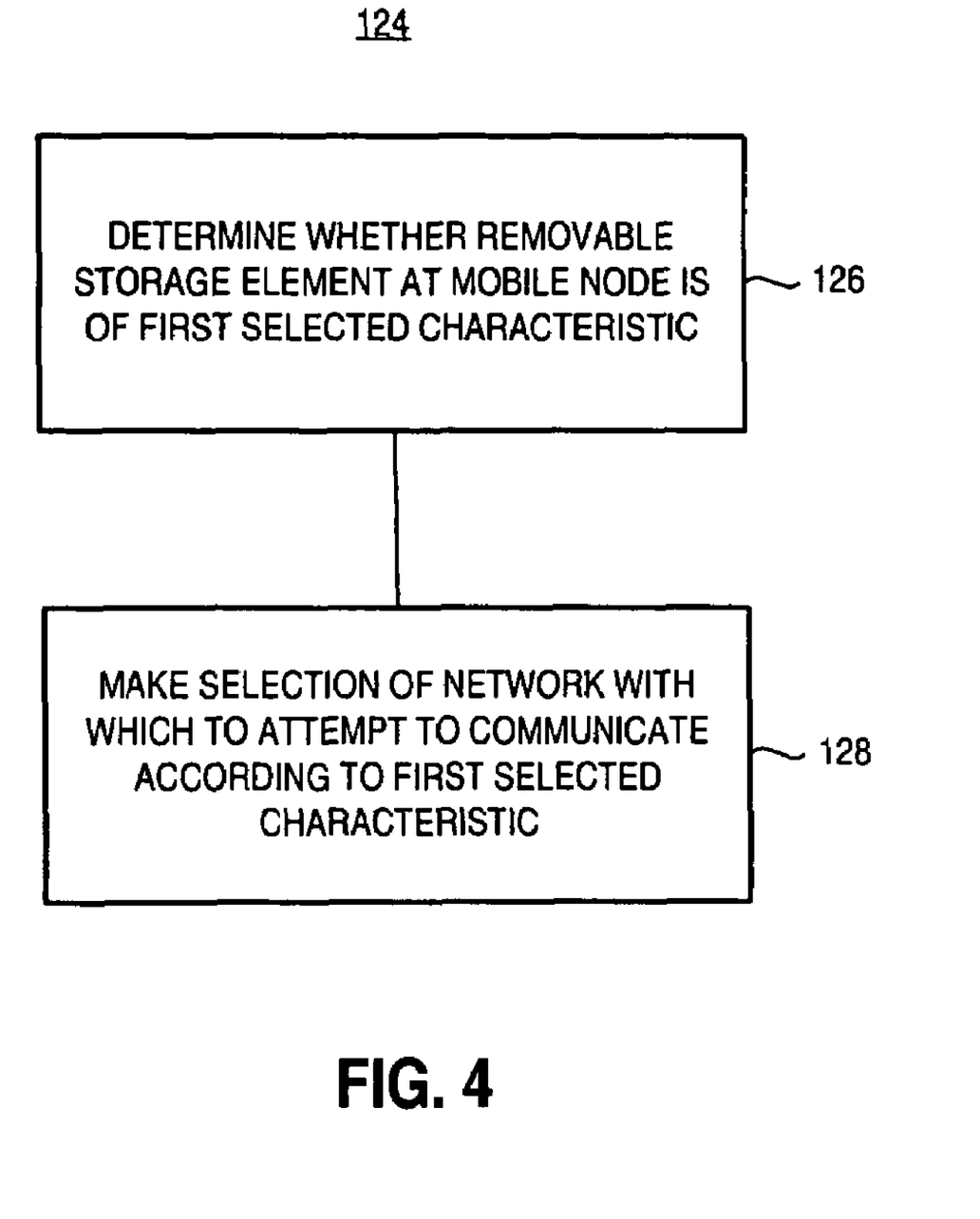
FIG. 4 illustrates a method flow diagram listing the method steps of the method of operation of an embodiment of the present invention.

FIG. 4 illustrates a method flow diagram, shown generally at 124, of the method of operation of an embodiment of the present invention. The method facilitates selection of at least a first selected network of a group of networks with which to attempt, by a mobile node, to communicate. First, and as indicated by the block 126, a determination is made at the mobile node whether the removable storage element, selectably contained at the mobile node, is of first selected characteristics. Then, and as indicated by the block 128, selection is made of the network with which to attempt to communicate. The selection that is made is made responsive to indications stored at the removable storage element if determinations are made to indicate that the removable storage element is of the first selected characteristics. Otherwise, selection is made responsive to indications stored at the second storage element.

Thereby, network selection is made through use of a network selection list contained at the removable storage element, if the removable storage element is of capability to store such a list and store such a list. Otherwise, the network selection list from which a selection is made is a network selection list that is maintained at the second storage element, e.g., an internal memory element of the mobile node.

A manner is thereby provided by which to utilize a smart card having capability of storing a network selection listing or, alternately, to permit selection of which wireless local area network with which to attempt to communicate using a network selection listing even when the smart card is of a legacy construction.

The previous descriptions are of preferred examples for implementing the invention, and the scope of the invention should not necessarily be limited by this description. The scope of the present invention is defined by the following claims.

What is claimed is:

1. Apparatus for a mobile node to facilitate selection of a first selected network of a group of networks with which to attempt to communicate, the mobile node connected to a removable storage element that, if of first selected characteristics, identifies the group of networks and includes a network selection list stored in the removable storage element, and the mobile node containing a second storage element, said apparatus comprising:

a determiner embodied at the mobile node, said determiner for determining whether the removable storage element, selectably connected to the mobile node, is of the first selected characteristics, otherwise, for determining whether a network selection list is stored in the second storage element;

a selector adapted to receive indications of determinations made by said determiner, said selector for selecting the first selected network of the group of networks with which to attempt to communicate, selection made by said selector responsive to indications and the network selection list stored at the removable storage element if determinations made by said determiner indicate the removable storage element is of the first selected characteristics and, otherwise, responsive to indications and the network selection list stored at the second storage element if determinations made by said determiner indicate that a network selection list is stored in the second storage element; and a downloader, adapted to receive indications of determinations made by said determiner, said downloader configured selectably to download and store indications of the group of networks stored at the removable storage element to the second storage element, available subsequently thereat responsive to determinations by said determiner that the removable storage element is of the first selected characteristics.

2. The apparatus of claim 1 wherein the network selection list, if stored at the removable storage element, includes at least a first entry.

3. The apparatus of claim 1 wherein said determiner determines whether the removable storage element is of the first selected characteristics by sending an interrogation message to the removable storage element and analyzing a response to the interrogation message.

4. The apparatus of claim 1 wherein the removable storage element further includes a flag location, the flag location populated with a first selected value when the removable storage element is of the first selected characteristics and wherein said determiner determines whether the flag location is populated with the first selected value.

5. The apparatus of claim 4 wherein the second storage element comprises an internal memory that non-releasably forms a portion of the mobile node and wherein said selector selects the first selected network responsive to indications stored at the internal memory when said determiner determines the removable storage element not to be of the first selected characteristics.

6. The apparatus of claim 1 wherein the mobile node is powered by a power supply switchingly connected to the mobile node, and wherein said determiner determines whether the removable storage element is of the first selected characteristics upon powering-up of the mobile node pursuant to connection of the mobile node to the power supply.

7. The apparatus of claim 1 wherein each network of the group of networks is identified by a Service Set Identifier and wherein the indications stored at the removable storage element, when of the first selected characteristics, identify the Service Set Identifier of at least one network of the group of networks.

8. The apparatus of claim 1 further comprising an indication updater and wherein the indications, if any, stored at the second storage element are selectably updatable by said indication updater.

9. The apparatus of claim 1 further comprising an indication updater and wherein the indications, if any, stored at the removable storage element are selectably updatable by said indication updater.

10. A method for a mobile node to facilitate selection of a first selected network of a group of networks with which to attempt to communicate, the mobile node containing a removable storage element that, if of first selected characteristics, identifies the group of networks and includes a network selection list stored in the removable storage element, and the mobile node containing a second storage element, said method comprising the operations of:

determining, at the mobile node, whether the removable storage element, selectably connected to the mobile node, is of the first selected characteristics, otherwise, determining whether a network selection list is stored in the second storage element;

selecting the first selected network of the group of networks with which to attempt to communicate, selection made during said operation of selecting responsive to indications and the network selection list stored at the removable storage element if determinations made during said operation of determining indicate the removable storage element to be of the first selected characteristics and, otherwise, responsive to indications and the network selection list stored at the second storage element if determinations made during said operation of determining indicate a network selection list is stored in the second storage element; and downloading and storing indications stored at the removable storage element to the second storage element, available subsequent thereat, responsive to determinations by said determiner that the removable storage element is of the first selected characteristics.

11. The method of claim 10 wherein said operation of determining comprises interrogating the removable storage element to determine whether the removable storage element is of the first selected characteristics.

12. The method of claim 11 further comprising the operation of setting a flag location formed at the removable storage element with a first selected value when the removable storage element is of the first selected characteristics, and wherein said operation of interrogating comprises determining whether the flag location is populated with the first selected value.

* * * * *

UNITED STATES PATENT AND TRADEMARK OFFICE
CERTIFICATE OF CORRECTION

| | | |
|---|---|---|
| PATENT NO. | : 7,328,016 B2 | Page 1 of 1 |
| APPLICATION NO. | : 10/787901 | |
| DATED | : February 5, 2008 | |
| INVENTOR(S) | : Adrian Buckley | |

It is certified that error appears in the above-identified patent and that said Letters Patent is hereby corrected as shown below:

Col. 12, Claim 10, Line 27, please delete "...by said determiner...", and insert --...during said determining...--.

Signed and Sealed this
Fourth Day of October, 2011

David J. Kappos
*Director of the United States Patent and Trademark Office*